US010793162B2

(12) United States Patent
Yoon (10) Patent No.: US 10,793,162 B2
(45) Date of Patent: Oct. 6, 2020

(54) METHOD AND SYSTEM FOR PREDICTING DRIVING PATH OF NEIGHBORING VEHICLE

(71) Applicant: Hyundai Motor Company, Seoul (KR)

(72) Inventor: Ji Hyun Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 102 days.

(21) Appl. No.: 15/208,165

(22) Filed: Jul. 12, 2016

(65) Prior Publication Data

US 2017/0120926 A1 May 4, 2017

(30) Foreign Application Priority Data

Oct. 28, 2015 (KR) .......................... 10-2015-0150422

(51) Int. Cl.
*G06F 17/00* (2019.01)
*B60W 40/10* (2012.01)
(Continued)

(52) U.S. Cl.
CPC ........ *B60W 40/10* (2013.01); *B60W 30/0956* (2013.01); *B60W 30/18154* (2013.01);
(Continued)

(58) Field of Classification Search
CPC ............. B60W 40/10; B60W 30/0956; B60W 30/18154; B60W 2550/141;
(Continued)

(56) References Cited

U.S. PATENT DOCUMENTS 7,085,637 B2 * 8/2006 Breed .................. B60N 2/2863
340/440
8,457,892 B2 6/2013 Aso et al.
(Continued)

FOREIGN PATENT DOCUMENTS

CN 1668938 A 9/2005
CN 1761980 A 4/2006
(Continued)

OTHER PUBLICATIONS

Chinese Office Action dated Jun. 18, 2020 in corresponding Chinese Application No. 201610621178.7.

*Primary Examiner* — Ronnie M Mancho
(74) *Attorney, Agent, or Firm* — Mintz Levin Cohn Ferris Glovsky and Popeo, P.C.; Peter F. Corless (57) ABSTRACT

A method and system for predicting a driving path of a neighboring vehicle which may influence a subject vehicle is provided. The subject vehicle detects a segment adjacent to the neighboring vehicle which is currently driven and searches all segments connected to the segment. The method prevents a collision between the subject vehicle and the neighboring vehicle that occurs due to misrecognition of a position, a driving direction, or velocity of the neighboring vehicle, and more accurately predicts the driving path of the neighboring vehicle. The method includes receiving information of a neighboring road on which a subject vehicle is driven from a detailed map and detecting a segment showing the neighboring vehicle which is being currently driven from the information of the neighboring road. Segments are detected that are connected to the segment and the driving path of the neighboring vehicle is predicted.

12 Claims, 5 Drawing Sheets

(51) Int. Cl.
*B60W 30/18* (2012.01)
*B60W 30/095* (2012.01)
*G08G 1/16* (2006.01)
*G06N 5/04* (2006.01)
*G06N 7/00* (2006.01)

(52) U.S. Cl.
CPC ............... *G06N 5/04* (2013.01); *G06N 5/041* (2013.01); *G06N 7/005* (2013.01); *G08G 1/163* (2013.01); *G08G 1/166* (2013.01); *B60W 2552/05* (2020.02); *B60W 2554/00* (2020.02); *B60W 2556/50* (2020.02)

(58) Field of Classification Search
CPC ........ B60W 2550/20; B60W 2550/402; G06N 5/04; G06N 7/005; G08G 1/166
USPC ........................................................ 701/300
See application file for complete search history.

(56) References Cited

U.S. PATENT DOCUMENTS

| | | | |
|---|---|---|---|
| 8,571,302 B2 | 10/2013 | Yoon et al. | |
| 8,676,487 B2 | 3/2014 | Sakai et al. | |
| 8,781,720 B2 | 7/2014 | Kindo et al. | |
| 8,965,677 B2* | 2/2015 | Breed | B60W 30/04 701/301 |
| 9,031,089 B2* | 5/2015 | Rubin | G08G 9/02 370/445 |
| 9,132,775 B2 | 9/2015 | Ohama et al. | |
| 9,141,909 B2 | 9/2015 | Hisano | |
| 9,251,705 B2 | 2/2016 | Yoo et al. | |
| 9,546,876 B2 | 1/2017 | Kleve et al. | |
| 9,616,887 B2 | 4/2017 | Takagi | |
| 9,669,828 B2* | 6/2017 | Caveney | B60W 30/0953 |
| 9,694,813 B2* | 7/2017 | Toyoda | B60W 10/04 |
| 9,718,469 B2 | 8/2017 | Matsubara et al. | |
| 9,727,820 B2 | 8/2017 | Ono | |
| 9,767,696 B2 | 9/2017 | Arndt et al. | |
| 2005/0179580 A1 | 8/2005 | Cong et al. | |
| 2006/0217884 A1 | 9/2006 | Adachi | |
| 2008/0167821 A1* | 7/2008 | Breed | G08G 1/161 701/301 |
| 2008/0303696 A1 | 12/2008 | Aso et al. | |
| 2009/0228157 A1* | 9/2009 | Breed | B60W 30/16 701/1 |
| 2010/0082251 A1 | 4/2010 | Kogure | |
| 2012/0209505 A1* | 8/2012 | Breed | G01C 21/3697 701/409 |
| 2012/0323474 A1* | 12/2012 | Breed | B60W 30/04 701/117 |
| 2013/0325306 A1 | 12/2013 | Caveney et al. | |
| 2014/0088855 A1 | 3/2014 | Ferguson | |
| 2014/0195138 A1* | 7/2014 | Stelzig | G08G 1/0116 701/119 |
| 2015/0197248 A1* | 7/2015 | Breed | G08G 1/09626 701/93 |
| 2015/0202770 A1* | 7/2015 | Patron | G05D 1/024 700/245 |
| 2016/0054140 A1* | 2/2016 | Breed | G01C 21/3611 701/408 |
| 2016/0358477 A1* | 12/2016 | Ansari | G08G 1/167 |
| 2017/0057496 A1* | 3/2017 | Toyoda | B60W 10/04 |

FOREIGN PATENT DOCUMENTS

| | | |
|---|---|---|
| CN | 101395648 A | 3/2009 |
| CN | 101650891 A | 2/2010 |
| CN | 101681562 A | 3/2010 |
| CN | 102307769 A | 1/2012 |
| CN | 102878999 A | 1/2013 |
| CN | 102890869 A | 1/2013 |
| CN | 103250196 A | 8/2013 |
| CN | 103295408 A | 9/2013 |
| CN | 103454639 A | 12/2013 |
| CN | 103842230 A | 6/2014 |
| CN | 104050237 A | 9/2014 |
| CN | 104054119 A | 9/2014 |
| CN | 104464344 A | 3/2015 |
| CN | 104599529 A | 5/2015 |
| CN | 104915967 A | 9/2015 |
| CN | 104925055 A | 9/2015 |
| JP | 2005-115484 A | 4/2005 |
| JP | 2008-305014 A | 12/2008 |
| JP | 2009-003650 A | 1/2009 |
| JP | 2010-083312 A | 4/2010 |
| JP | 2012-164159 A | 8/2012 |
| JP | 2014-130550 A | 7/2014 |
| KR | 10-2015-0060953 A | 6/2015 |
| KR | 2015-0096924 A | 8/2015 |
| WO | 2015-008588 A1 | 1/2015 |

* cited by examiner

METHOD AND SYSTEM FOR PREDICTING DRIVING PATH OF NEIGHBORING VEHICLE

CROSS-REFERENCE TO RELATED APPLICATION

This application is based on and claims the benefit of priority to Korean Patent Application No. 10-2015-0150422, filed on Oct. 28, 2015 in the Korean Intellectual Property Office, the disclosure of which is incorporated herein in its entirety by reference.

TECHNICAL FIELD

The present disclosure relates to a method and system for predicting a driving path of a neighboring vehicle, and more particularly, to a technology of detecting a driving path of a neighboring vehicle based on the neighboring vehicle and a detailed map.

BACKGROUND

In the related art, since a variety of variables such as a mad lane, a method for detecting a vehicle, a change in intensity of light based on weather and time of day, a difference between a lane center and an optical axis of an imaging device, and the like are considered to generate a collision warning of the vehicle, it was difficult to accurately recognize the vehicle in a method for generating a collision warning of a vehicle. According to the related art, to determine a collision with a neighboring vehicle when the vehicle is being driven, a method of using laser has been generally used.

In other words, a driver assistance system (DAS) such as an adaptive cruise control (ACC) and a forward collision warning (FCW) for providing convenience to a driver and improving driving stability has been commercialized, and research such as a traffic jam assist (TJA), a stop & go ACC development, or the like considering a complex driving situation has also been actively conducted. For the DAS, a sensing of the neighboring vehicle and recognition of an obstacle which are robust and have high reliability are key factors. Currently, the ACC or FCW system has been generally developed based on radar capable of measuring a longitudinal distance regardless of the weather in an expressway environment However, the radar has a problem that performance thereof is decreased in the complex driving environment For example, when multiple forward vehicles are being driven at the same velocity while being adjacent to each other, the radar is not capable of distinguishing the multiple vehicles due to characteristics of a sensor itself, the radar is not capable of recognizing a stopped vehicle due to diffused reflection of a radar signal, and the like.

In a method for predicting a driving direction or a driving path of a neighboring vehicle using a variety of sensors as well as the radar, since misrecognition in the sensor mounted within the vehicle often occurs, there are problems in that the driving direction or the driving path of the neighboring vehicle may be accurately predicted, and reliability of a predicting result is decreased.

SUMMARY

The present disclosure provides a method and system for predicting a driving path of a neighboring vehicle which may influence a subject vehicle when the subject vehicle detects a segment adjacent to the neighboring vehicle which is currently driven and searches all segments connected to the segment, and a method capable of preventing a collision between the subject vehicle and the neighboring vehicle that may occur due to misrecognition of a position, a driving direction, or velocity of the neighboring vehicle, and more accurately predicting the driving path of the neighboring vehicle.

Other objects and advantages of the present disclosure may be appreciated by the following description and will be clearly described by the exemplary embodiments of the present disclosure. It will be easily known that the objects and advantages of the present disclosure may be implemented by means and a combination thereof shown in the appended claims.

According to an exemplary embodiment of the present disclosure, a method for predicting a driving path of a neighboring vehicle may include receiving information regarding a neighboring road on which a subject vehicle is being driven from a detailed map; detecting a segment showing a neighboring vehicle which is being currently driven from the information of the neighboring road; and detecting segments connected to the segment and predicting the driving path of the neighboring vehicle.

The driving path of the neighboring vehicle may be predicted using any one of a most probable path (MPP), a probability estimation path (PEP), and a defensive estimation path (DEP). The detection of the segment showing a position of the neighboring vehicle and the neighboring vehicle which is being currently driven may include using a grid map or quad tree method. In the predicting of the driving path of the neighboring vehicle, a path to which the neighboring vehicle is moved may be predicted using velocity, acceleration or a driving direction of the neighboring vehicle. When there is no segment which influences an advancing direction of the subject vehicle, the driving path of the neighboring vehicle may not be predicted. When the neighboring vehicle is driven in the same lane as the subject vehicle, or is driven at the rear of the subject vehicle, the driving path of the neighboring vehicle may not be predicted.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Advantages and features of the present disclosure and methods to achieve them will be described from exemplary embodiments described below in detail with reference to the accompanying drawings. However, the present disclosure is not limited to the exemplary embodiments set forth herein, but may be modified in many different forms. Merely, the exemplary embodiments of the present disclosure will be provided to describe the spirit of the present disclosure in detail so that those skilled in the art may easily implement the spirit of the present disclosure.

In the drawings, the exemplary embodiments of the present disclosure are not limited to illustrated specific forms, but are exaggerated for clarity. In the present specification, specific terms have been used, but are just used for the purpose of describing the present disclosure and are not used for qualifying the meaning or limiting the scope of the present disclosure, which is disclosed in the appended claims.

In the present specification, an expression 'and/or' is used as a meaning including at least one of components listed before and after the expression. In addition, an expression 'connected to or coupled to' is used as a meaning including a case in which one component is directly connected to another component or is indirectly connected through another component. Unless explicitly described to the contrary, a singular form includes a plural form in the present specification.

Hereinafter, exemplary embodiments of the present disclosure will be described in detail with reference to the accompanying drawings.

Particularly, an electronic controller unit (ECU) of a subject vehicle may be configured to receive a driving path of a neighboring vehicle (e.g., a vehicle traveling within a particular proximity to the subject vehicle) using a radar and a scanner of the subject vehicle, and a sensor including vehicle to everything (V2X) including communication between the vehicle and all objects such as vehicle to vehicle (V2V), vehicle to infrastructure (V2I), vehicle to pedestrian (V2P), and the like, and may be configured to more accurately predict the driving path of the neighboring vehicle using the received driving path of the neighboring vehicle and segment information received from a detailed map.

Specifically, detailed map may be a pre-stored map or received from a GPS, obtained in real-time.

Figure 1A:
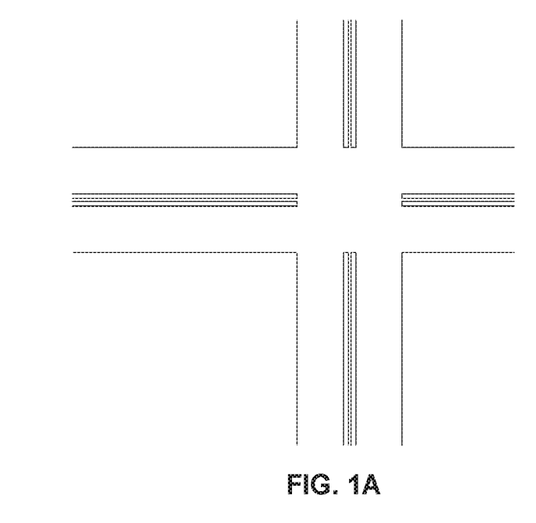
FIGS. 1A-1B and 2A-2B are diagrams illustrating segments provided on an actual road and a detailed map to detect a driving path of a neighboring vehicle according to an exemplary embodiment of the present disclosure.
Figure 1B:
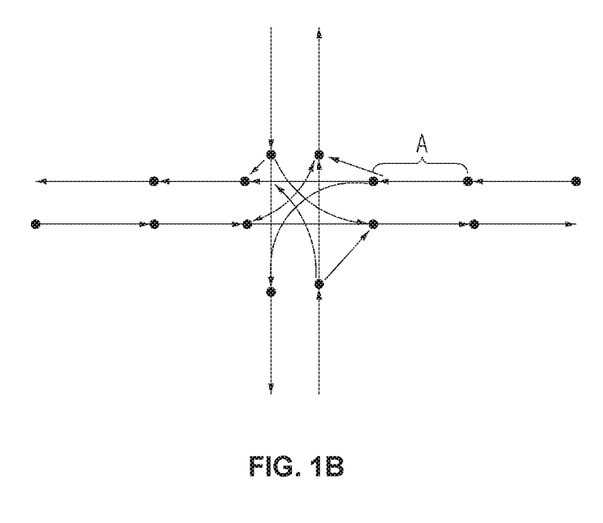

FIGS. 1A-1B and 2A-2B are diagrams illustrating segments provided (e.g., formed) on an actual road and a detailed map to detect a driving path of a neighboring vehicle according to an exemplary embodiment of the present disclosure. Referring to FIGS. 1A-1B, FIG. 1A illustrates the actual road, and FIG. 1B illustrates the actual road as the detailed map based on an advancing (e.g., traveling) direction of the vehicle. Specifically, the actual road may be displayed on the detailed map by connecting segments A, which are minimum units capable of expressing the road. In other words, various points or segments are illustrated on a view of the road on which the subject vehicle is being driven.

Figure 2A:
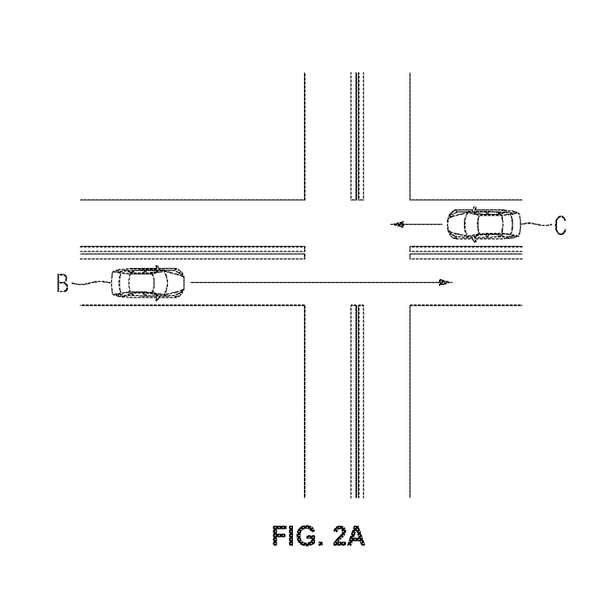
Figure 2B:
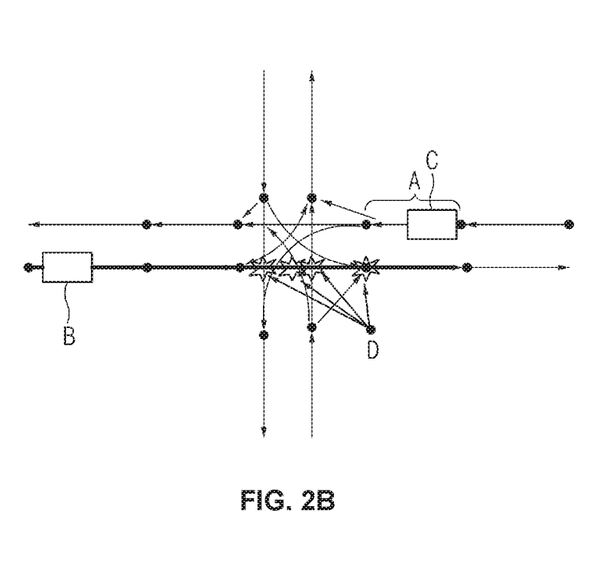

Referring to FIGS. 2A-2B, FIG. 2A illustrates an advancing direction of a subject vehicle B and an advancing direction of a neighboring vehicle C on the actual road, and FIG. 2B illustrates the advancing direction (e.g., a driving direction or a driving path) of the vehicles on the detailed map. In particular, the advancing direction C of the neighboring vehicle may be displayed on the detailed map by the segments expressing the advancing direction of the neighboring vehicle C (e.g., traveling directions shown in arrows in FIG. 2B). Further, collision risk zones D between the subject vehicle B and the neighboring vehicle C are displayed within the segments.

Specifically, the subject vehicle B may be configured to receive information regarding a neighboring road (e.g., a next mad lane) on which the subject vehicle B is being driven from the detailed map. Thereafter, the ECU of the subject vehicle may be configured to detect a segment provided to a position closest to the neighboring vehicle C which is being currently driven from the received information of the neighboring road and detect segments connected to a segment on which the neighboring vehicle is being currently driven, thereby making it possible to predict a path to which the neighboring vehicle C is moved using the driving path of the segments. In particular, the information regarding the neighboring road may include position information and velocity information of the neighboring vehicle C.

As a method for detecting the position of the neighboring vehicle C and the segment closest to the neighboring vehicle C which is being currently driven, a grid map or quad tree method may be used. In other words, to detect a segment that is closest to the position of the neighboring vehicle C in the grid map or quad tree method, the position of the subject vehicle B or the neighboring vehicle C may be displayed by a point, and may be displayed as a high-order equation of a straight line or a curved line connected by the points. The grid map or quad tree method is one of methods of calculating a shortest distance between the segments.

According to the grid map or quad tree method, the segment closest to the position of the neighboring vehicle C may be determined, and a time taken to calculate a distance between the neighboring vehicle C and the segment A may be reduced to thus detect the segment closest to the neighboring vehicle C. Further, the subject vehicle B may be configured to calculate distances between the segments connected to the segment A closest to the position of the neighboring vehicle C and the neighboring vehicle C, and may be configured to predict the path to which the neighboring vehicle C is moved using velocity, acceleration or a driving direction of the neighboring vehicle C.

However, when the segment which influences the advancing direction of the subject vehicle B is not present on the detailed map, the subject vehicle B may not be capable of predicting the driving path of the neighboring vehicle C. Further, when the neighboring vehicle is being driven on the same road lane as the subject vehicle B or is being driven while being positioned at the rear of the subject vehicle B (e.g., traveling behind the subject vehicle), the subject vehicle B may be capable of predicting the driving path of the neighboring vehicle C.

Figure 3:
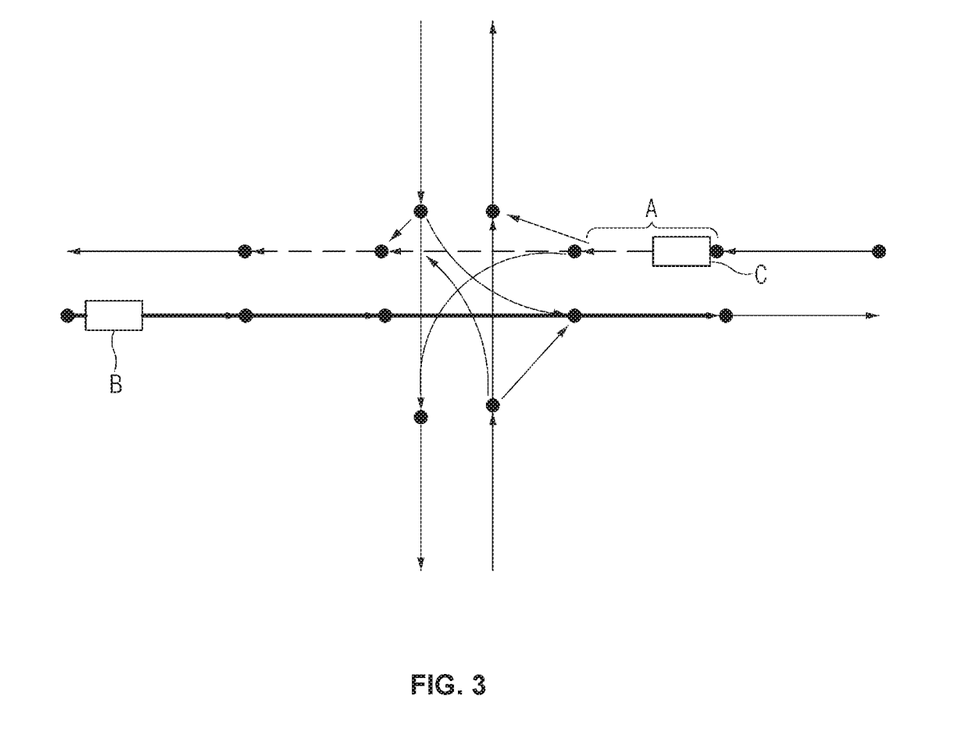
FIG. 3 is a diagram illustrating a method for predicting a driving path of a neighboring vehicle using a most probable path (MPP) according to an exemplary embodiment of the present disclosure.

FIG. 3 is a diagram illustrating a method for predicting a driving path of a neighboring vehicle using a most probable path (MPP) according to an exemplary embodiment of the present disclosure. Referring to FIG. 3, the MPP is one of methods in which the subject vehicle B predicts the driving path of the neighboring vehicle C, and is a method which is mainly used in navigation. In particular, the MPP is a method for predicting a driving path of a vehicle and may be used to determine the probability that the neighboring vehicle C will travel straight (e.g., not make a turn), when the connected segments are connected by the straight line when the segment A closest to the neighboring vehicle C and other segments are connected to each other on the detailed map.

Figure 4A:
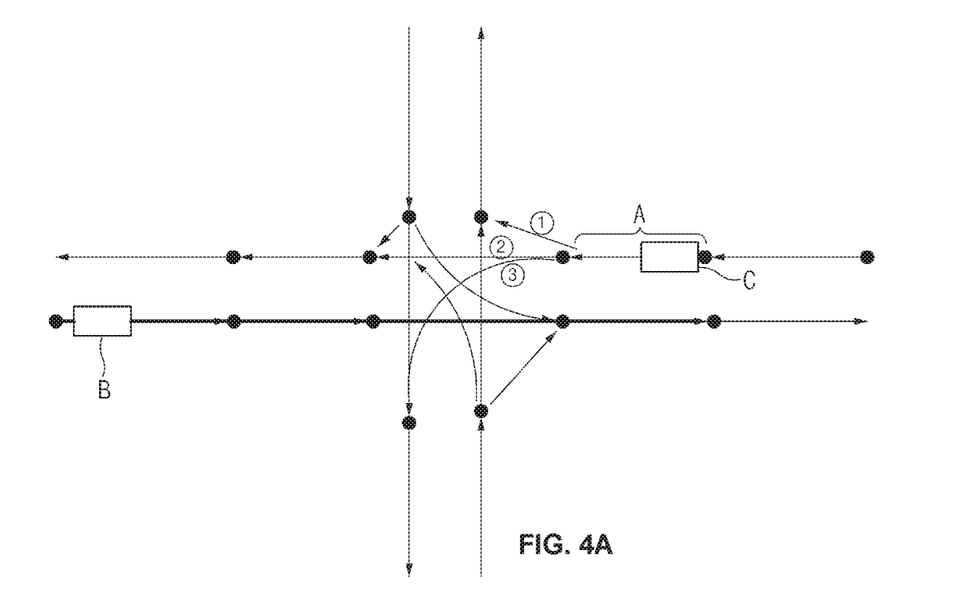
FIGS. 4A-4B are diagrams illustrating a method for predicting a driving path of a neighboring vehicle using a probability estimation path (PEP) according to an exemplary embodiment of the present disclosure.
Figure 4B:
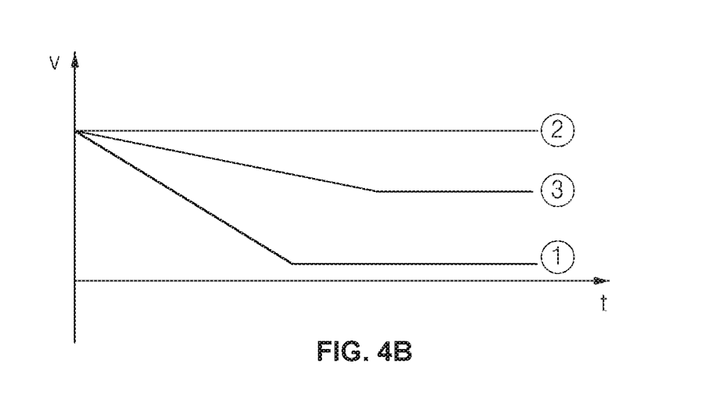

FIGS. 4A-4B are diagrams illustrating a method for predicting a driving path of a neighboring vehicle using a probability estimation path (PEP) according to an exemplary embodiment of the present disclosure.

Referring to FIG. 4A, the PEP is a method for predicting a driving path of a vehicle in which the subject vehicle B may be configured to predict a segment to which the neighboring vehicle C is highly possible (e.g., high probability) to move using the position, the velocity, the acceleration, and the like of the neighboring vehicle C. Specifically, the PEP is a method for predicting a driving path of a vehicle using the position, the velocity, the acceleration, or curvature information of the connected segment A of the neighboring vehicle C and calculating probability that the segment A closest to the neighboring vehicle C enters the connected segments.

For example, when the neighboring vehicle C turns to the right (1), a curvature is greater compared to driving velocity of the neighboring vehicle, when the neighboring vehicle C travels straight ahead (2), the curvature is smallest compared to the driving velocity of the neighboring vehicle, and when the neighboring vehicle C turns to the left (3), the curvature is smaller than when the neighboring vehicle turns to the right (1) compared to the driving velocity of the subject vehicle, but the curvature is greater than when the neighboring vehicle travels straight ahead (2).

Referring to FIG. 4B, when there is minimal change in the driving velocity of the neighboring vehicle C, probability that the neighboring vehicle C will travel straight ahead (2) is high. When the driving velocity of the neighboring vehicle C is rapidly changed, probability that the neighboring vehicle C turns to the right (1) is high. Additionally, when the driving velocity of the neighboring vehicle is gradually changed, probability that the neighboring vehicle C turns to the left (3) is high.

Figure 5:
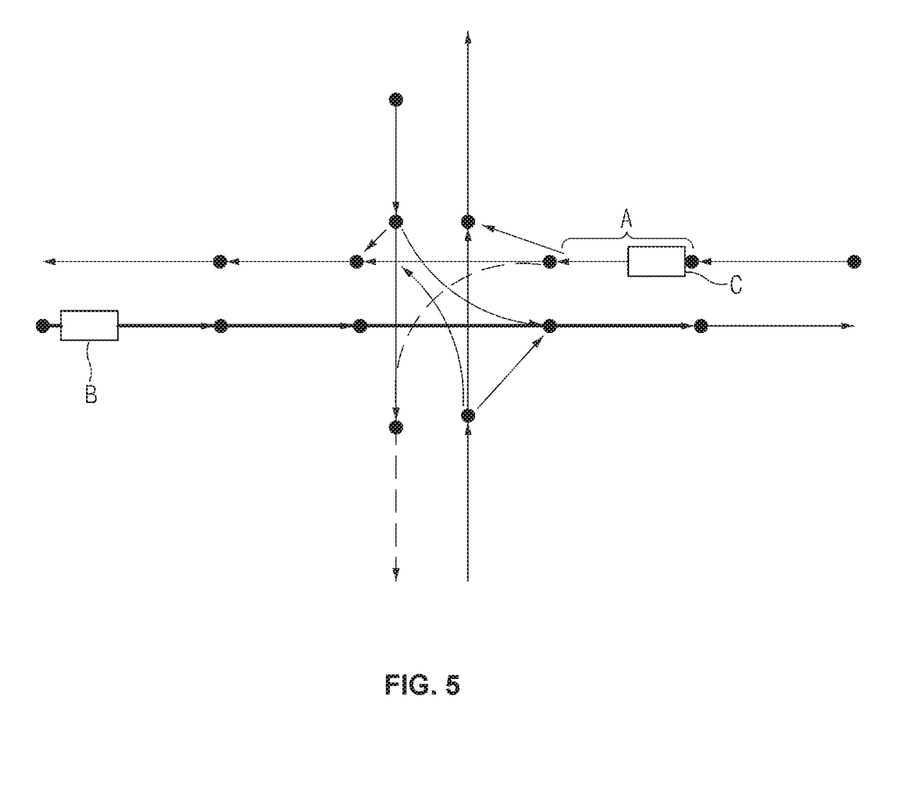
FIG. 5 is a diagram illustrating a method for predicting a driving path of a neighboring vehicle using a defensive estimation path (DEP) according to an exemplary embodiment of the present disclosure.

FIG. 5 is a diagram illustrating a method for predicting a driving path of a neighboring vehicle using a defensive estimation path (DEP) according to an exemplary embodiment of the present disclosure. Referring to FIG. 5, the DEP is a method for predicting a direction of a segment which may influence a driving direction of the subject vehicle B. In other words, the DEP is a method in which the driving direction and the velocity of the subject vehicle B may be adjusted in advance by predicting that the neighboring vehicle C which is driven in a direction of the subject vehicle B in an opposite direction of the subject vehicle B turns to the left rather than turning to the right or traveling straight ahead, when it is expected that the subject vehicle B travels straight ahead.

As described above, according to the exemplary embodiments of the present disclosure, collision between the subject vehicle and the neighboring vehicle that occurs due to misrecognition of the position, the driving direction, or the velocity of the neighboring vehicle may be prevented. Further, the method for predicting a driving path of a neighboring vehicle capable of more accurately predicting the driving path of the neighboring vehicle by displaying the driving path of the neighboring vehicle by the segments of the detailed map may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for predicting a driving path of a neighboring vehicle proximate to a subject vehicle, comprising:
   receiving, by a controller, information regarding a neighboring road that is connected to a road on which the subject vehicle is being driven using a detailed map, the neighboring road including a plurality of connected segments, each segment corresponding to a minimum unit expressing a road;
   determining, by the controller, a segment that is closest to the neighboring vehicle by calculating a shortest distance between the segment and the neighboring vehicle using a grid map or quad tree;
   detecting, by the controller, segments of one or more roads connected to the segment;
   predicting, by the controller, the driving path of the neighboring vehicle using the detected segments of one or more roads and a velocity, an acceleration, or a driving direction received from the neighboring vehicle using V2X communication with the neighboring vehicle; and
   adjusting, by the controller, a driving direction and a velocity of the subject vehicle based on the predicted the driving path of the neighboring vehicle.

2. The method according to claim 1, wherein the driving path of the neighboring vehicle is predicted using any one of a most probable path (MPP), a probability estimation path (PEP), and a defensive estimation path (DEP).

3. The method according to claim 1, wherein when there is no segment of a road which influences an advancing direction of the subject vehicle, the driving path of the neighboring vehicle is not predicted.

4. The method according to claim 1, wherein when the neighboring vehicle is driven on a same lane as the subject vehicle, or is driven at a rear of the subject vehicle, the driving path of the neighboring vehicle is not predicted.

5. A system for predicting a driving path of a neighboring vehicle proximate to a subject vehicle, comprising:
   a memory configured to store program instructions; and
   a processor configured to execute the program instructions, which when executed cause the processor to:
      receive information regarding a neighboring road that is connected to a road on which the subject vehicle is being driven using a detailed map, the neighboring road including a plurality of connected segments, each segment corresponding to a minimum unit expressing a road;
      determine a segment that is closest to the neighboring vehicle by calculating a shortest distance between the segment and the neighboring vehicle using a grid map or quad tree;
      detect segments of one or more roads connected to the segment;
      predict the driving path of the neighboring vehicle using the detected segments of one or more roads and a velocity, an acceleration, or a driving direction received from the neighboring vehicle using V2X communication with the neighboring vehicle; and
      adjust a driving direction and a velocity of the subject vehicle based on the predicted the driving path of the neighboring vehicle.

6. The system according to claim 5, wherein the driving path of the neighboring vehicle is predicted using any one of a most probable path (MPP), a probability estimation path (PEP), and a defensive estimation path (DEP).

7. The system according to claim 5, wherein when there is no segment of a road which influences an advancing direction of the subject vehicle, the driving path of the neighboring vehicle is not predicted.

8. The system according to claim 5, wherein when the neighboring vehicle is driven on a same lane as the subject vehicle, or is driven at a rear of the subject vehicle, the driving path of the neighboring vehicle is not predicted.

9. The method according to claim 1, further comprising displaying the predicted driving path of the neighboring vehicle.

10. The method according to claim 9, further comprising displaying one or more collision risk zones in conjunction with the predicted driving path of the neighboring vehicle.

11. The system according to claim 5, further comprising a display configured to display the predicted driving path of the neighboring vehicle.

12. The system according to claim 11, wherein the display is further configured to display one or more collision risk zones in conjunction with the predicted driving path of the neighboring vehicle.

* * * * *